(12) United States Patent
Ray et al.

(10) Patent No.: US 7,559,737 B2
(45) Date of Patent: Jul. 14, 2009

(54) VERTICALLY STAGGERED PALLET STACKING ASSEMBLY LINE AND METHOD

(75) Inventors: Christopher A. Ray, Port Orange, FL (US); David N. Cooley, Port Orange, FL (US); Gary D. Hunt, Port Orange, FL (US); J. Michael Connor, West Chester, PA (US); Gert B. Gast, Kleve (DE); Donald Peter Welch, Port Orange, FL (US); Mark T. Brogan, Lake Helen, FL (US); John P. Choufani, Port Orange, FL (US); Kevin F. Keyes, New Smyrna Beach, FL (US)

(73) Assignee: Sentry Equipment Erectors Inc., Forest, VA (US)

( * ) Notice: Subject to any disclaimer, the term of this patent is extended or adjusted under 35 U.S.C. 154(b) by 89 days.

(21) Appl. No.: 11/036,921

(22) Filed: Jan. 14, 2005

(65) Prior Publication Data
US 2006/0182545 A1 Aug. 17, 2006

(51) Int. Cl.
 *B65G 57/02* (2006.01)
 *B65G 1/18* (2006.01)
 *B65G 57/00* (2006.01)
(52) U.S. Cl. ............... 414/792.9; 414/793; 414/799; 198/418.3; 198/435
(58) Field of Classification Search ............ 414/790.2, 414/799, 792.9, 793, 801; 901/6, 7, 8; 198/435, 198/418.3, 465.2, 418.2
See application file for complete search history.

(56) References Cited
U.S. PATENT DOCUMENTS

| | | | | |
|---|---|---|---|---|
| 2,822,932 | A | * | 2/1958 | Patrick ............ 414/790.7 |
| 3,050,199 | A | * | 8/1962 | McGrath et al. ...... 414/792 |
| 3,777,873 | A | | 12/1973 | Stuart |
| 4,155,467 | A | | 5/1979 | Lingl |
| 4,182,442 | A | | 1/1980 | Jones |

(Continued)

FOREIGN PATENT DOCUMENTS

DE 3637114 A * 5/1988

(Continued)

*Primary Examiner*—Gregory W Adams
(74) *Attorney, Agent, or Firm*—Nixon & Vanderhye P.C.

(57) ABSTRACT

A new type of pallet stacking assembly line. Two pick-and-place robots are used. The first robot has a relatively low position. The second robot is in an elevated position. A pallet dispenser dispenses a first pallet onto a pallet conveyor. The pallet conveyor then moves the first pallet to a first build position in front of the first robot. The first robot then begins picking products from a first pick position and stacking them on the first pallet. Once the products on the first pallet reach approximately half the finished height, the pallet conveyor carries the first pallet over to a second build position in front of the second robot. At the same time, the pallet dispenser dispenses a second pallet which is carried to the first build position. The second robot picks products from a second pick position and places them on the upper portion of the first pallet in order to complete the stack. Meanwhile, the first robot is picking and placing products on the lower portion of the second pallet. The process continues indexing, with both robots ideally being busy all the time. Each robot only has to build half the pallet. Thus, overall line speed is increased.

7 Claims, 11 Drawing Sheets

U.S. PATENT DOCUMENTS

| | | | |
|---|---|---|---|
| 4,692,876 A * | 9/1987 | Tenma et al. | 700/249 |
| 4,941,374 A | 7/1990 | Focke | |
| 4,976,584 A | 12/1990 | Focke | |
| 5,100,284 A | 3/1992 | Boisseau | |
| 5,182,741 A | 1/1993 | Maeda et al. | |
| 5,348,440 A | 9/1994 | Focke | |
| 5,443,357 A | 8/1995 | Leeds et al. | |
| 5,671,837 A * | 9/1997 | Tazou et al. | 198/369.2 |
| 5,891,371 A | 4/1999 | Lepper et al. | |
| 5,975,837 A | 11/1999 | Focke et al. | |
| 6,290,448 B1 | 9/2001 | Focke et al. | |
| 6,579,053 B1 | 6/2003 | Grams et al. | |
| 6,626,632 B2 * | 9/2003 | Guenzi et al. | 414/789.6 |

FOREIGN PATENT DOCUMENTS

| | | |
|---|---|---|
| DE | 41 18 640 A1 | 1/1992 |
| DE | 42 20 026 A1 | 9/1993 |
| EP | 131555 A1 * | 1/1985 |
| JP | 62012523 A * | 1/1987 |
| JP | 62074832 A * | 4/1987 |
| JP | 05317999 A * | 12/1993 |

* cited by examiner

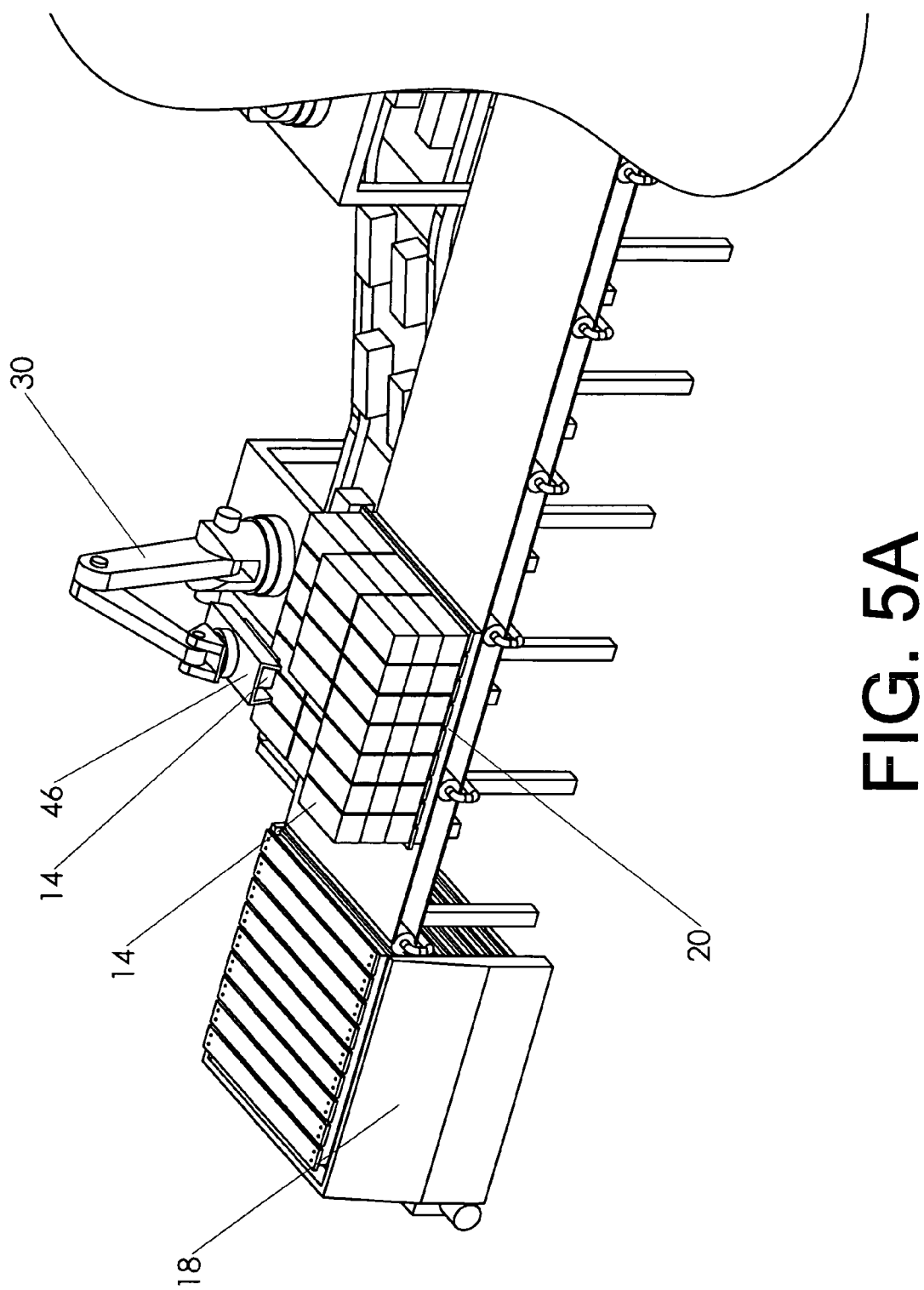

VERTICALLY STAGGERED PALLET STACKING ASSEMBLY LINE AND METHOD

BACKGROUND OF THE INVENTION

1. Field of the Invention

This invention relates to the field of manufacturing. More specifically, the invention comprises an assembly line featuring two or more pick-and-place robots that are offset vertically (as well as horizontally) in order to increase the speed of the assembly line.

2. Description of the Related Art

It has long been known to assemble items on a pallet for shipping and storage. The pallet provides a base of support, as well as a convenient lifting point. Items are stacked on the pallet to a desired height. The completed assembly is then typically bound together using shrink wrapping, banding, or other known methods.

Pick-and-place robots are used to automate the assembly of products on a pallet. Conveyors carry the products to the robot, which then picks the products up, orients them correctly, and places them correctly on the pallet. Such robots are quite versatile, in that they can handle a variety of product sizes, shapes, and masses. With the addition of suitable product identifying means (bar codes and the like) and controlling software, the robot can "nest" various products into a volumetrically efficient stack. Such a robot can also be used to handle a variety of products simply by changing the controlling software.

However, those skilled in the art will know that such robots are limited in operational speed. The robot must typically swing over to a pick station, grab a product, reorient the product, swing the product over the pallet, and properly place the product in the nested stack. These operations take time, and ultimately limit the speed of such an assembly line. Thus, an assembly line having the versatility of pick-and-place robots, yet with faster speed, is desirable.

BRIEF SUMMARY OF THE PRESENT INVENTION

The present invention comprises a new type of pallet stacking assembly line. FIG. 1 shows the major components of one embodiment. Two pick-and-place robots are used. The first robot has a relatively low position. The second robot is in an elevated position. A pallet dispenser dispenses a first pallet onto a pallet conveyor. The pallet conveyor then moves the first pallet to a first build position in front of the first robot. The first robot then begins picking products from a first pick position and stacking them on the first pallet.

Once the products on the first pallet reach approximately half the finished height, the pallet conveyor carries the first pallet over to a second build position in front of the second robot. At the same time, the pallet dispenser dispenses a second pallet which is carried to the first build position. The second robot picks products from a second pick position and places them on the upper portion of the first pallet in order to complete the stack. Meanwhile, the first robot is picking and placing products on the lower portion of the second pallet. The process continues indexing, with both robots ideally being busy all the time. Each robot only has to build half the pallet. Thus, overall line speed is increased.

BRIEF DESCRIPTION OF THE SEVERAL VIEWS OF THE DRAWINGS

FIG. 5A is a perspective view, showing the operation of the present invention.

REFERENCE NUMERALS IN THE DRAWINGS

| | | | |
|---|---|---|---|
| 10 | pallet stacking line | 12 | product conveyor |
| 14 | product | 16 | pallet conveyor |
| 18 | pallet dispenser | 20 | pallet |
| 22 | first pick position | 24 | second pick position |
| 26 | first build position | 28 | second build position |
| 30 | first robot | 32 | second robot |
| 34 | base | 36 | first pivot |
| 38 | second pivot | 40 | third pivot |
| 42 | fourth pivot | 44 | fifth pivot |
| 46 | lifting attachment | 48 | turret |
| 50 | first arm | 52 | second arm |
| 54 | first robot pedestal | 56 | second robot pedestal |
| 58 | inside feed belt | 60 | outside feed belt |
| 64 | through-feed gate | 66 | ramp |
| 68 | stop | 70 | third pick position |
| 72 | third robot | 74 | third robot pedestal |
| 76 | alternate stacking line | 78 | wrist |

DETAILED DESCRIPTION OF THE INVENTION

Figure 1:
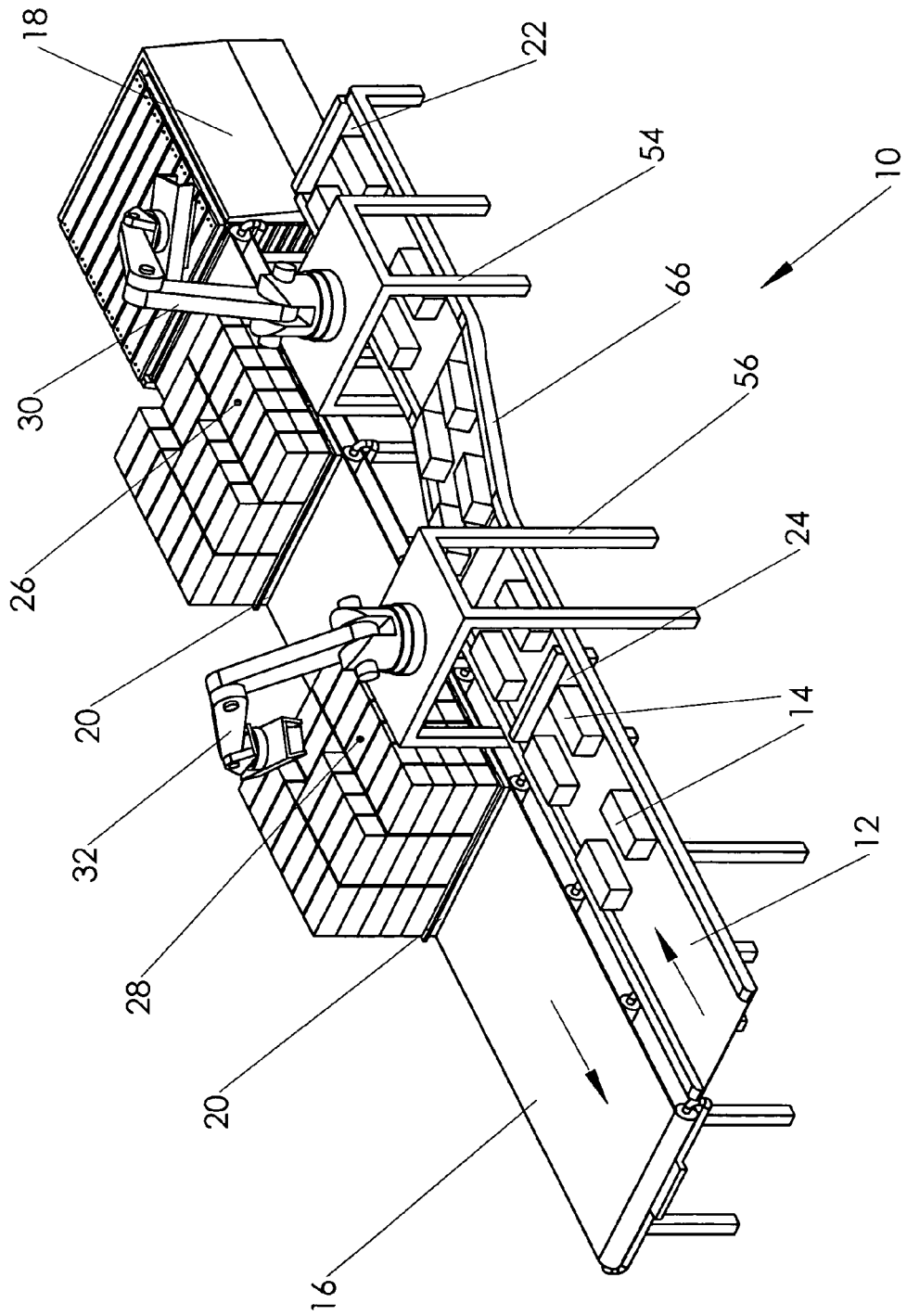
FIG. 1 is a perspective view, showing the proposed invention.

FIG. 1 shows one embodiment of the present invention. Pallet stacking line 10 is built around pallet conveyor 16. Pallet dispenser 18 dispenses single pallets onto pallet conveyor 16 at appropriate times. The pallets are then carried down the pallet conveyor to first build position 26 and second build position 28.

First robot 30 is mounted atop first robot pedestal 54. It is positioned next to first build position 26. Second robot 32 is mounted atop second robot pedestal 56, alongside second build position 28.

The assembly line is configured to stack products 14 onto pallets. Product conveyor 12 conveys the products to the robots. Those skilled in the art will know that such a conveyor can assume many forms. The version shown in FIG. 1 may actually be two conveyors placed side by side in order to increase the delivery of products. The drawing view shows a simplified rendition of this product conveyor. The reader should bear in mind that many other types could be substituted for the belt-type shown. These would include simple gravity feeders, vibratory feeders, and the like.

Figure 3A:
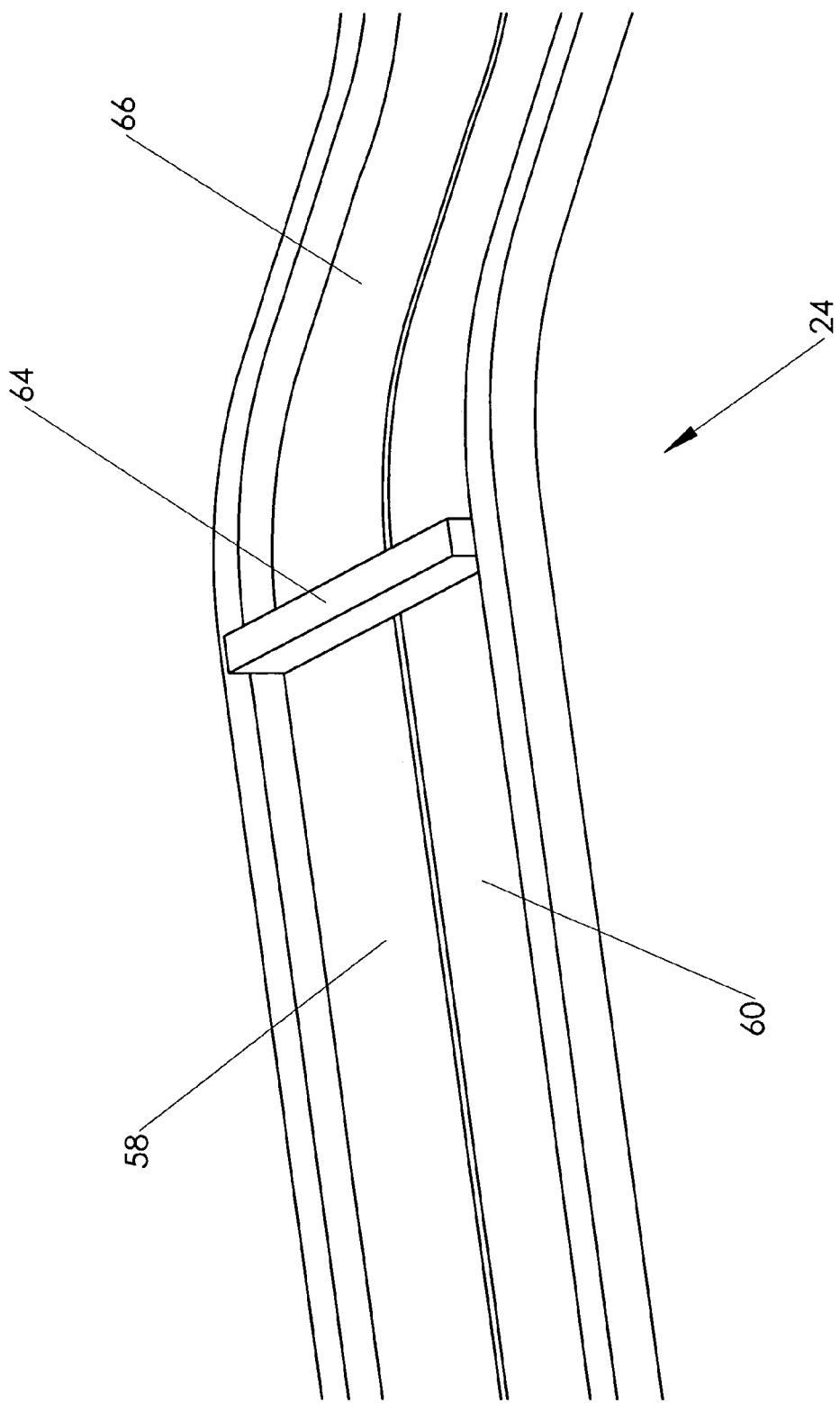
FIG. 3A is a detail view, showing a pick position.

Two separate pick positions are provided, with the term "pick position" meaning a location where the products are stationary for a period sufficient to allow them to be grabbed by a robot. The product conveyor in FIG. 1 feeds initially to second pick position 24, under second robot 32, down ramp 66, under first robot 30, and from there to first pick position 22. FIG. 3A shows a detail view of second pick position 24. The products are fed in from the left side of the view. Inside feed belt 58 and outside feed belt 60 independently feed products along. These belts preferably feed products along in such a manner that any product picked by a robot from pick position 24 is rapidly replaced. Two through-feed gates 64 regulate the flow of products out of the second pick position and down ramp 66. These through feed gates can be lowered flush with or below the level of the conveyor belts, so that products can pass over them.

Figure 3B:
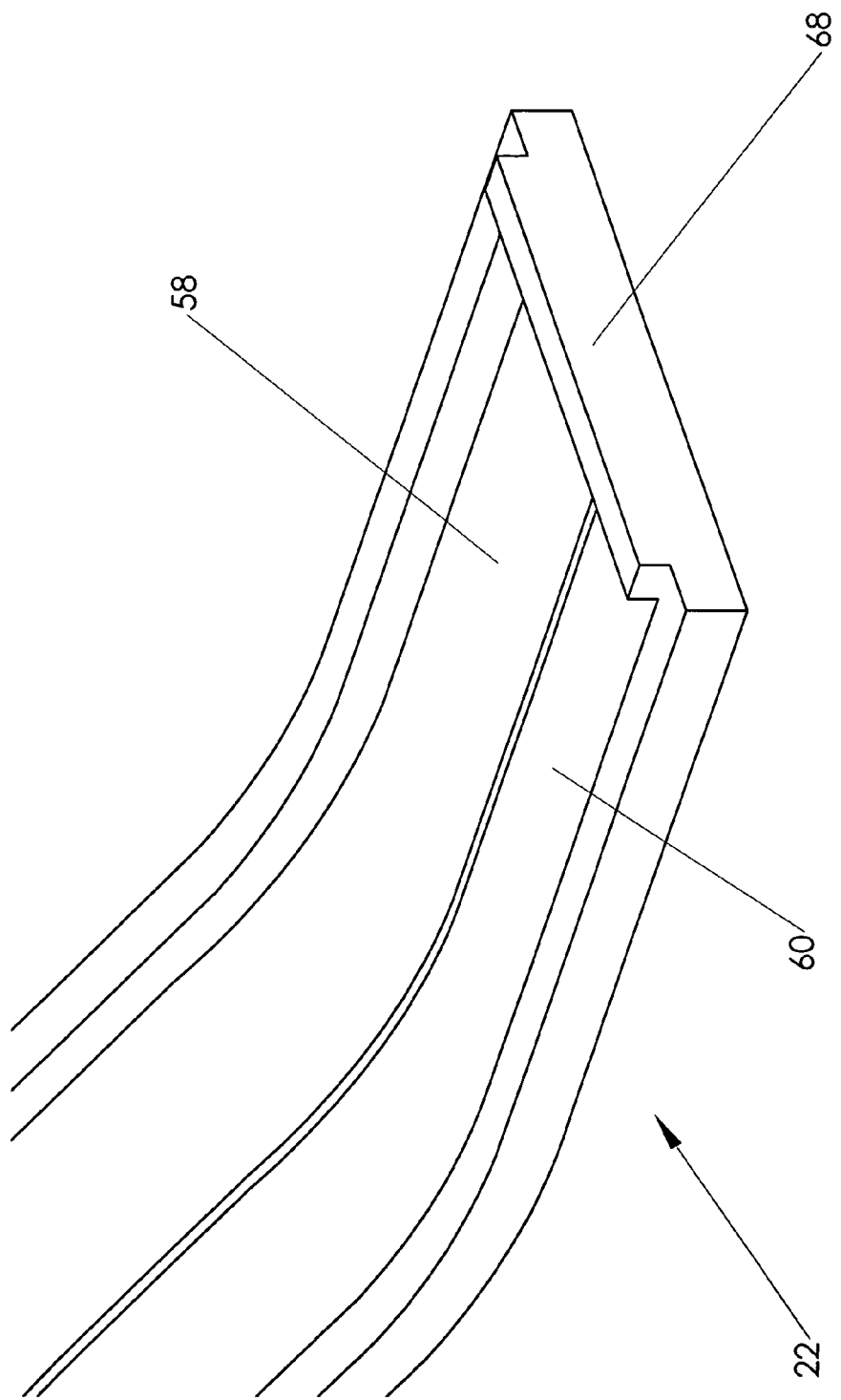
FIG. 3B is a detail view, showing a pick position.

FIG. 3B shows a detail view of first pick position 22. It features stops 68, which prevent any product going beyond the first pick position. Such conveyors and controlling gates are well known to those in the art. However, a brief description may be helpful. Still referring to FIG. 3B, when first robot 30 removes a product from the first pick position, the appropriate conveyor is activated to feed a new product into position.

Of course, those products reaching the first pick position must first pass through the second pick position. Looking at FIG. 3A, if the second robot picks a product off inside feed belt 58, the appropriate conveyor is activated to feed a new product to the void. If additional products are needed down at first pick position 22, the far through-feed gate 64 can be opened for a period to pass products through the second pick position, down the ramp, and over to the first pick position, while the second robot is placing the product just picked. Using this approach, product conveyor 12 keeps a steady supply of products at the two pick positions.

Figure 2:
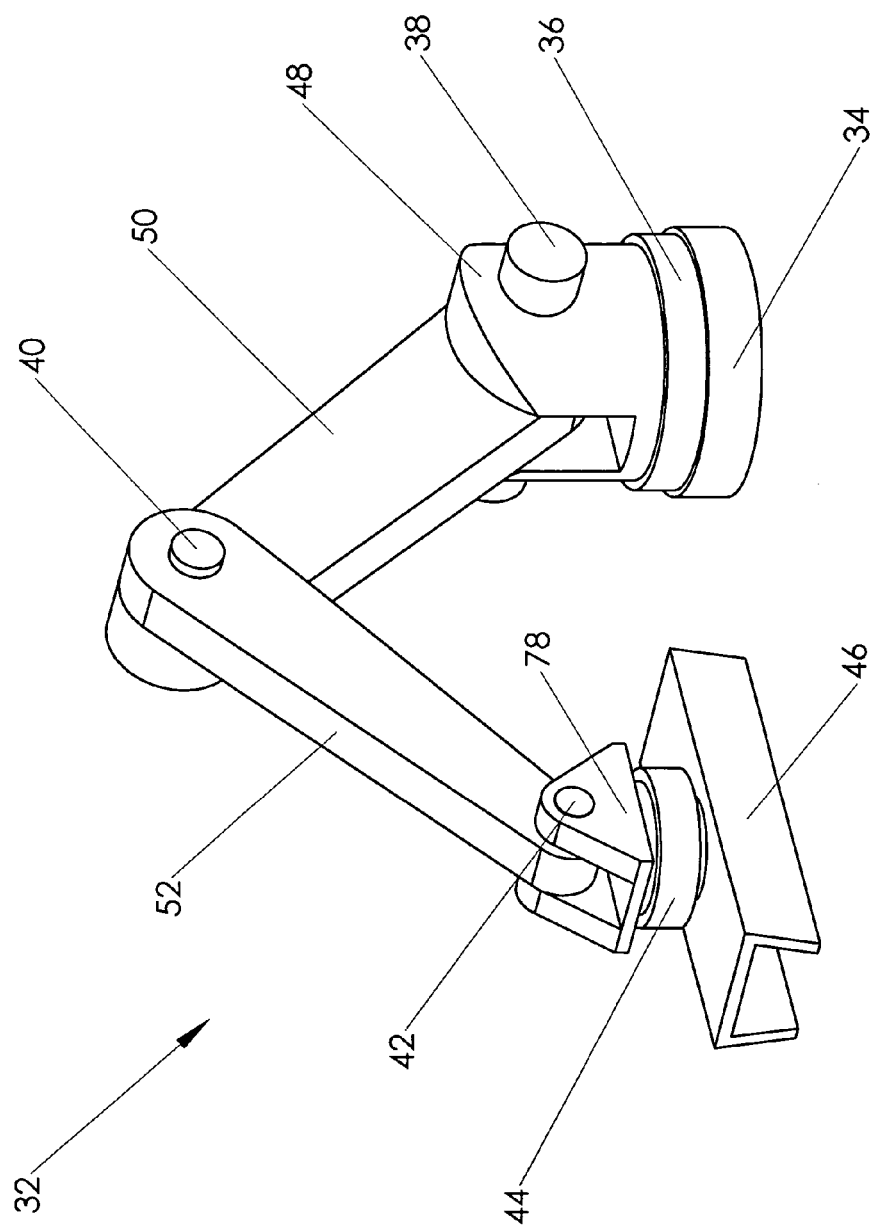
FIG. 2 is a perspective view, showing a typical pick-and-place robot.

FIG. 2 shows a typical pick-and-place robot (in this case; second robot 32 from the line shown previously). Base 34 attaches the robot to its mount. First pivot 36 allows turret 48 to rotate with respect to base 34. Second pivot 38 allows first arm 50 to pitch with respect to turret 48. Third pivot 40 allows second arm 52 to pitch with respect to first arm 50. Fourth pivot 42 allows wrist 78 to pitch with respect to second arm 52. Fifth pivot 44 allows lifting attachment 46 to rotate with respect to wrist 78. The lifting attachment also includes devices for lifting a product, such as plates which pinch together, suction points, or similar devices.

Robots such as shown in FIG. 2 are very flexible. They can handle a variety of different products placed in a variety of different ways. Because of these facts a single assembly line can be used to handle a variety of products—such as cardboard boxes one day and soda bottles the next. However, those skilled in the art will know that such flexible robots are often not as fast as custom-configured machinery. The present invention seeks to ameliorate this speed limitation.

Figure 4:
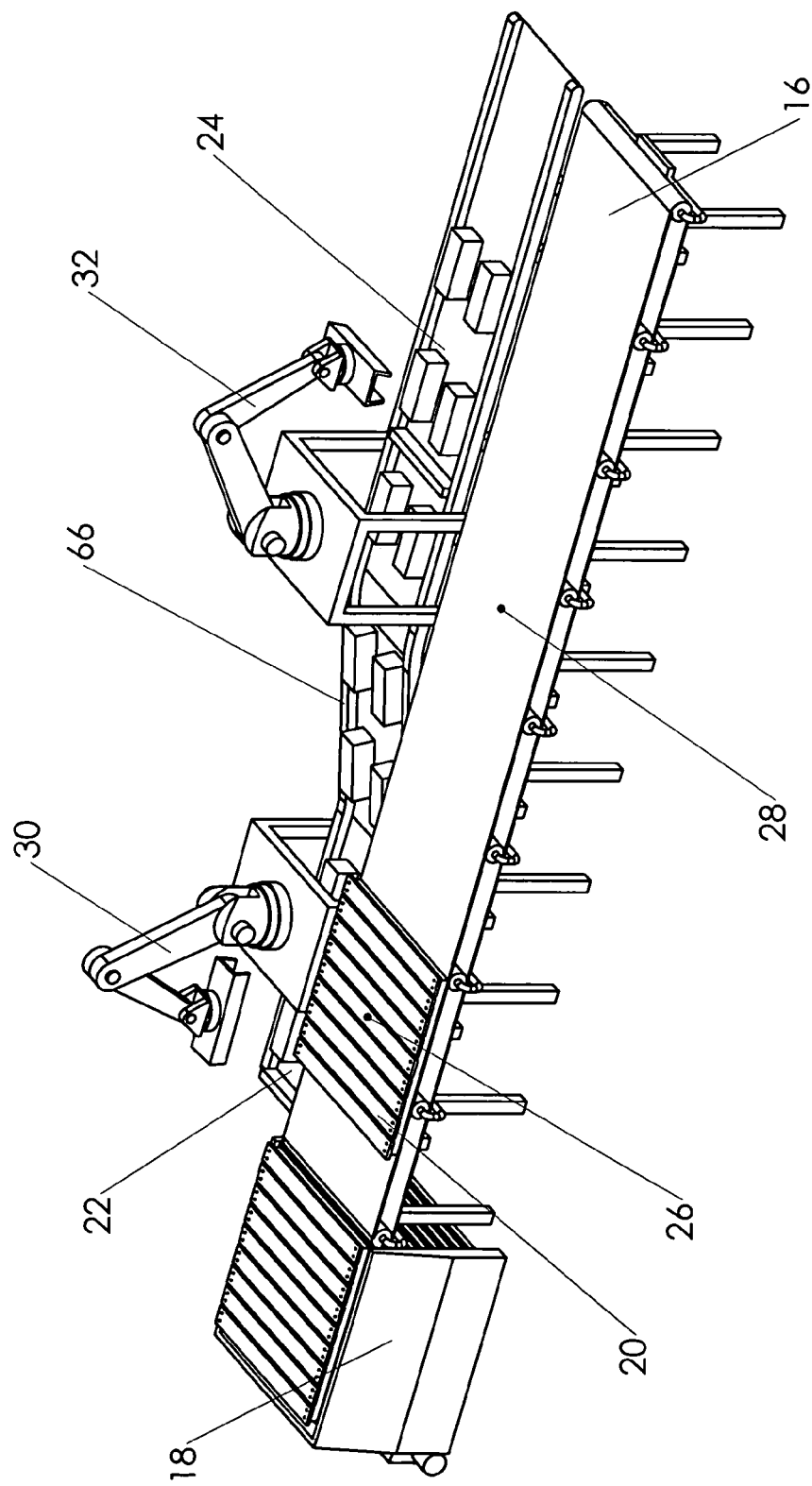
FIG. 4 is a perspective view, showing the operation of the present invention.

FIGS. 4 through 6B illustrate the proposed assembly line in operation. In FIG. 4, pallet dispenser 18 has dispensed a pallet 20 onto pallet conveyor 16. The pallet is then moved down the line and brought to rest at first build position 26. First robot 30 is then activated. It picks products from first pick position 22 and stacks them on the pallet.

Figure 5B:
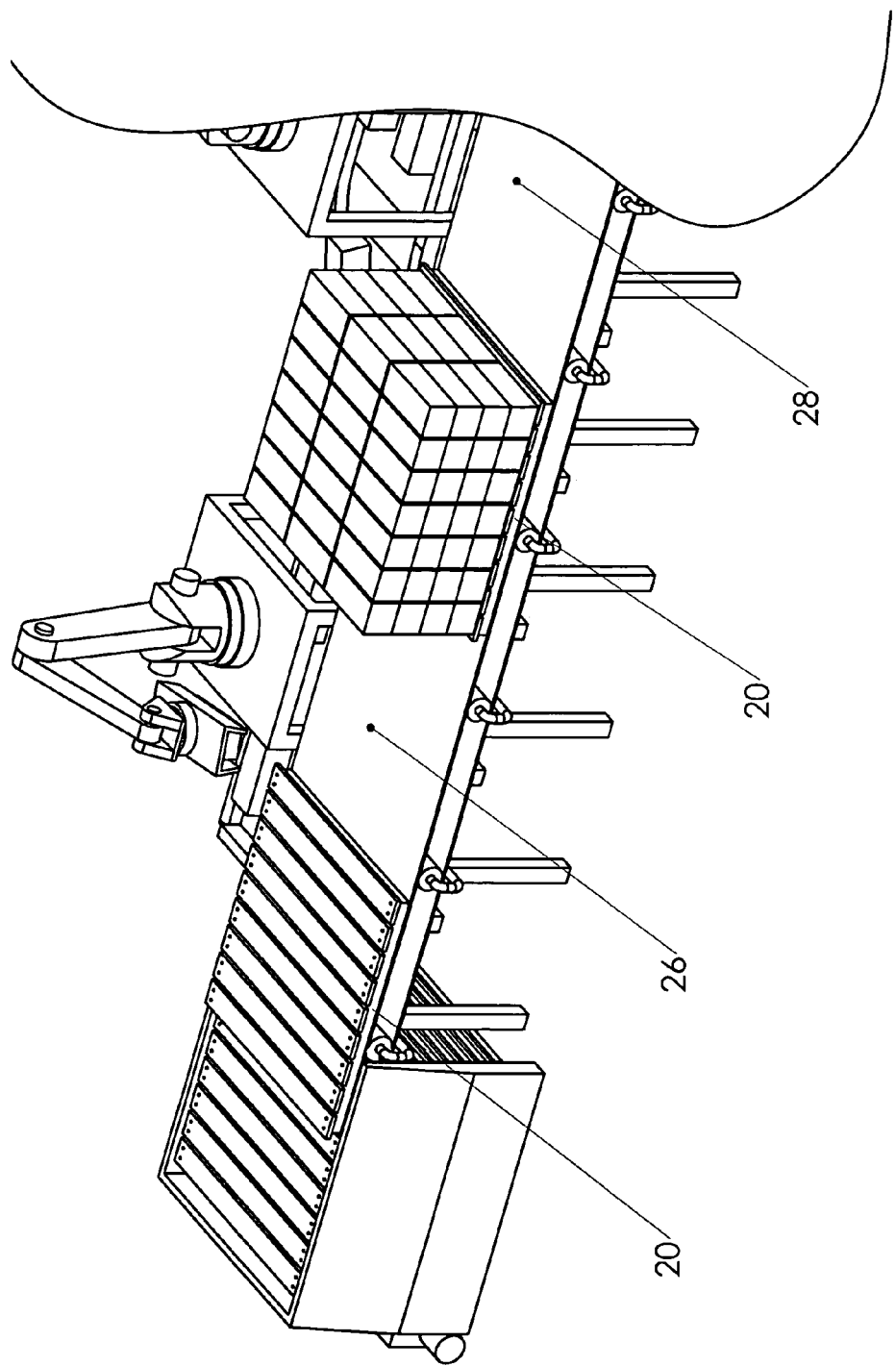
FIG. 5B is a perspective view, showing the operation of the present invention.

In FIG. 5A, the stack of products 14 on pallet 20 is approaching one half the total specified height of the completed pallet. FIG. 5B shows the operation just after the first half of the stack has been completed. At this point, the first robot has paused. Pallet conveyor 16 is activated to move the first pallet from first build position 26 to second build position 28 (moving from left to right in the view). The pallet dispenser is activated while this move is ongoing in order to place a second pallet on the pallet conveyor. FIG. 5B shows this second pallet approaching first build position 26. This second pallet is dispensed so that as the first pallet reaches the second build position, the second pallet reaches the first build position.

Figure 6A:
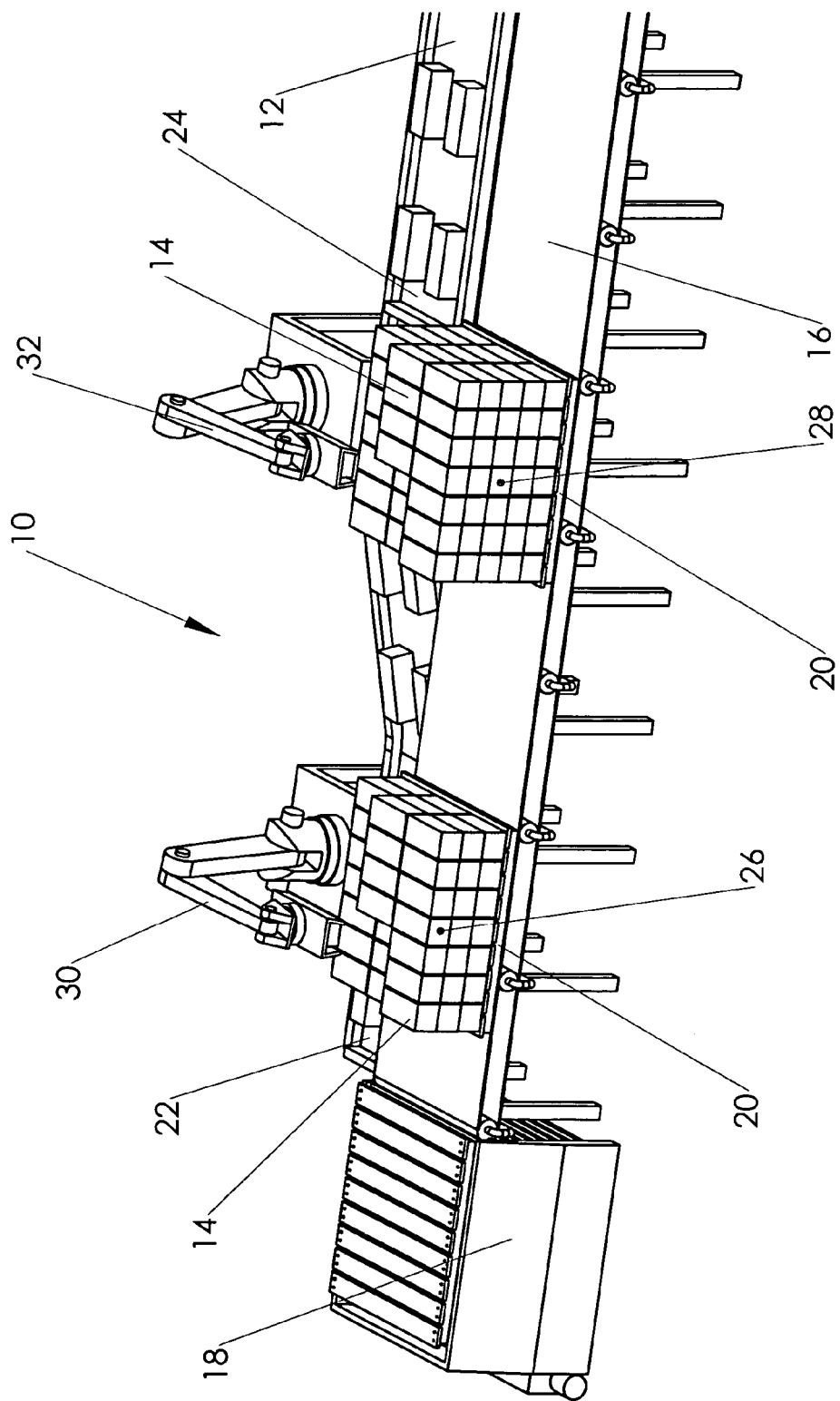
FIG. 6A is a perspective view, showing the operation of the present invention.

Once the first pallet reaches second build position 28 and the second pallet reaches first build position 26, second robot 32 begins picking products from the second pick position and stacking them on the first pallet in order to build the upper half of the stack. At the same time, first robot 30 is starting anew stack on the second pallet. FIG. 6A shows this step in the process, with both robots in operation (FIG. 6A shows the two pallets after the robots have completed about 70% of their respective stacking tasks).

Figure 6B:
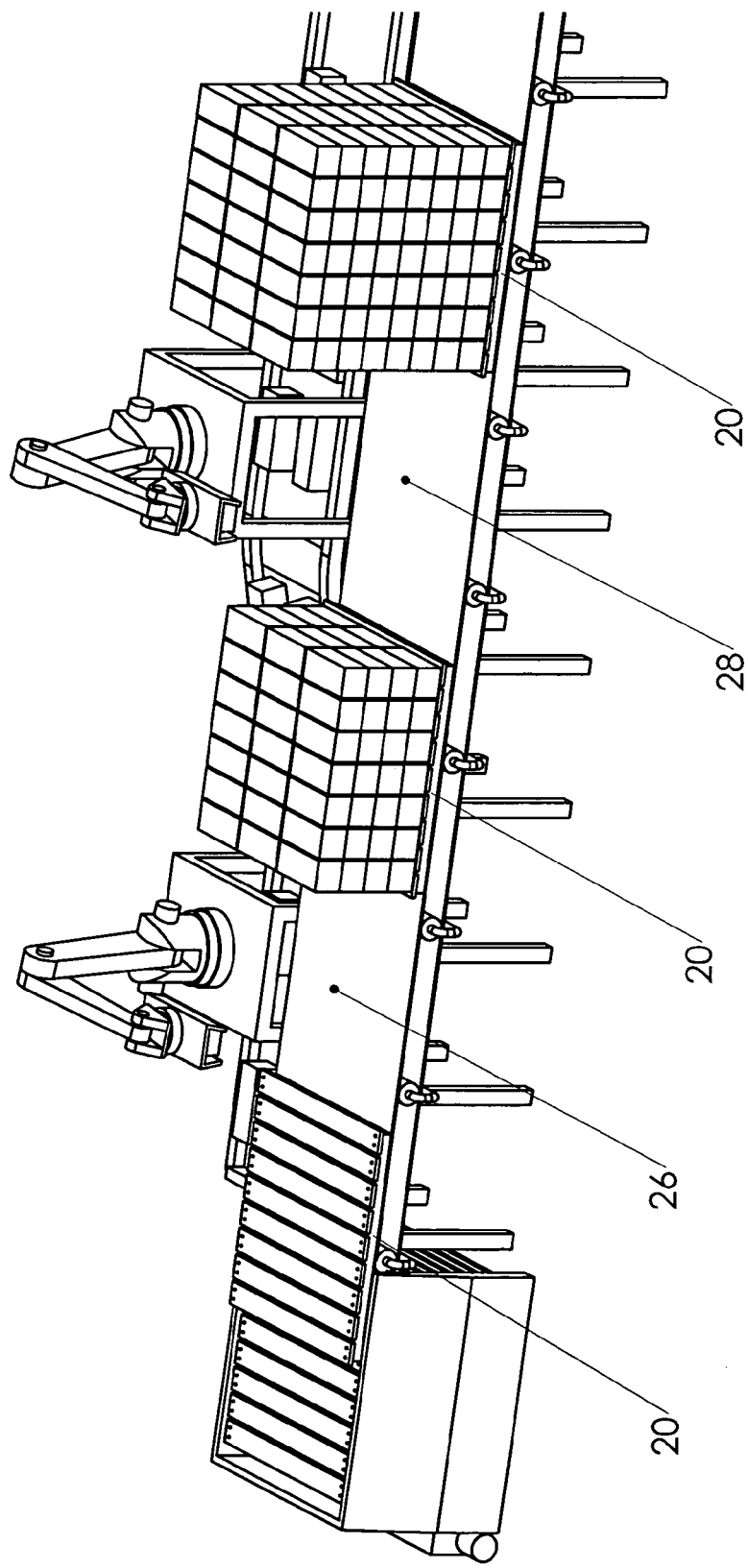
FIG. 6B is a perspective view, showing the operation of the present invention.

Once the stack on the first pallet is completed, the entire process indexes one position (The pallet at the second build position is completed and moved down the line; the pallet at the first build position moves to the second build position; and a fresh pallet is placed on the first build position). FIG. 6B shows this step in the process. The reader will note that the leading pallet 20 supports a completed stack of products and is moving down the line (from left to right in the view). The next pallet 20 supports one half of a completed stack and is moving to second build position 28. The pallet dispenser is also dispensing a new (empty pallet), which is moving toward first build position 26.

The reader will thereby realize that the two robots are in nearly continuous operation, with the first robot building the lower half of each pallet stack and the second robot building the upper half of each pallet stack. The line's productivity is nearly doubled, since during most of the cycle two pallets are being loaded instead of only one. This productivity enhancement can be easily understood by contemplating the rate at which completed pallets pass down the pallet conveyor. In the conventional approach—using only one robot—a completely stacked pallet rolls down the line at a time interval equal to the time needed for a single robot to stack all the products on the pallet.

Using the approach shown in FIG. 6B, a completed pallet moves away from the second build position every time the line "indexes" (moves a pallet from build position to build position). This indexing occurs at a time interval equal to the time needed for a single robot to stack one half of the products on the pallet. Thus, the production rate is nearly doubled. It is not exactly doubled, since some time is lost moving the pallets from station to station, but this time loss is minimal.

The approach shown has other advantages as well. A robot having a range of motion encompassing the entire pallet stack is no longer needed. The placing of the second robot at a higher elevation allows the use of a relatively small robot having a relatively limited range of motion. This fact means that the same type of robot can be used for both build positions.

Figure 7:
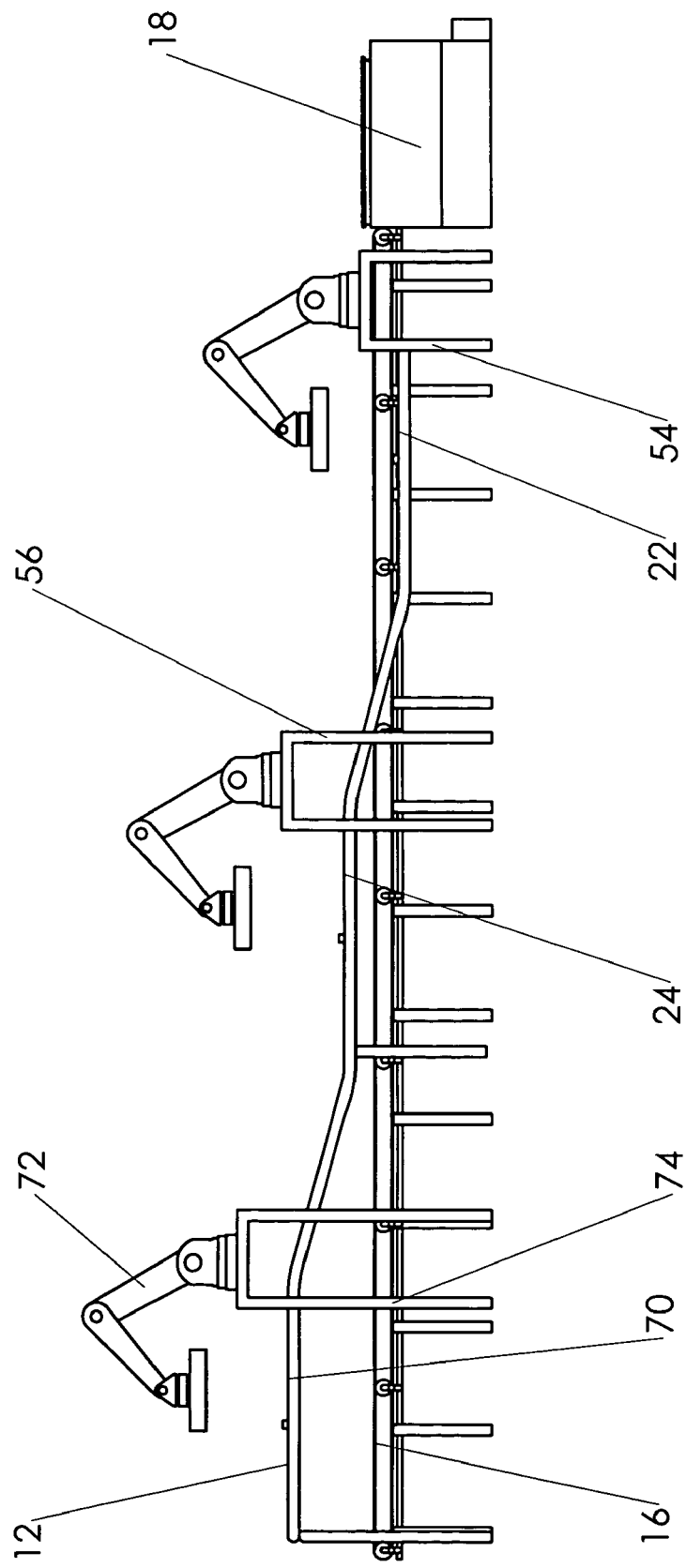
FIG. 7 is an elevation view, showing an alternate embodiment of the proposed invention.

Of course, those skilled in the art will realize that the approach just described is not limited to the use of two robots. A two-robot approach implies dividing the pallet stack into a lower half and an upper half. If three robots are used, then the pallet stack can be divided into a lower third, a middle third, and an upper third. FIG. 7 shows such an embodiment, employing first robot 30, second robot 32, and third robot 72.

Third robot 72 sits atop third robot pedestal 74. A product conveyor is used as before, but the version shown in this embodiment has three pick positions, including the addition of third pick position 70 proximate third robot 72. The robots are vertically staggered so that the first robot's range of motion encompasses the lower third of the pallet stack, the second robot's range of motion encompasses the middle third of the pallet stack, and the third robot's range of motion encompasses the upper third of the pallet stack.

The line shown in FIG. 7 allows simultaneous operations on three pallets, with one being proximate each robot. While the first robot is stacking the lower third, the second robot will be stacking the middle third and the third robot will be stacking the upper third. This configuration nearly triples the output speed of the assembly line. Of course, the approach can be expanded to use four or more robots in such a vertically staggered arrangement.

Figure 8:
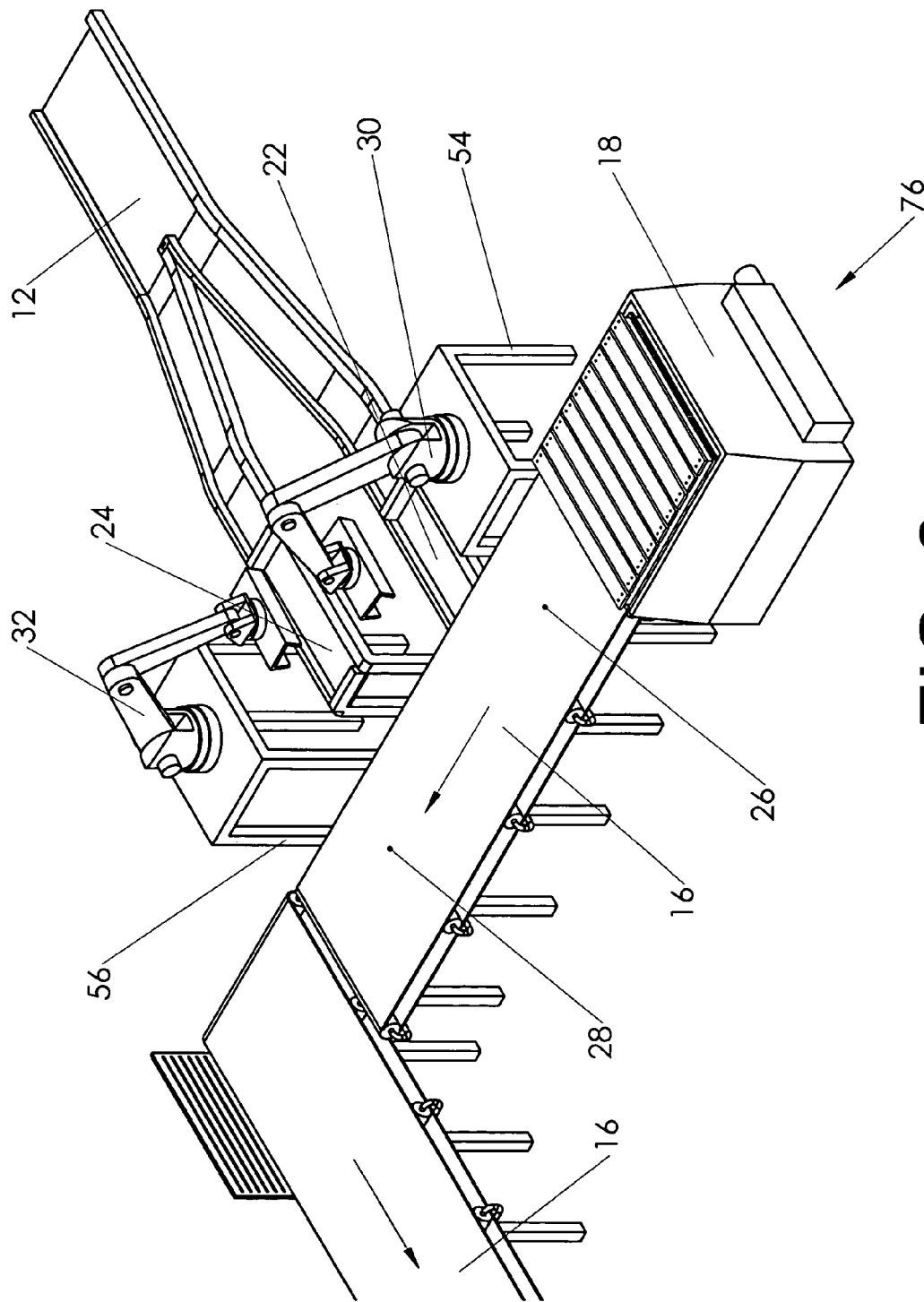
FIG. 8 is an elevation view, showing an alternate embodiment of the proposed invention.

A linear assembly line has been illustrated thus far, but those skilled in the art will know that many line configurations can be developed using the present invention. FIG. 8 shows one such approach, designated as alternate stacking line 76. This version uses a pallet conveyor with a ninety degree bend. Two adjoining belts are used, along with a stop gate and various control features. All these assembly line components are conventional and—as they do not form a novel portion of the present invention—they will not be described in further detail. The reader will observe that the pallets pass through first build position 26 and second build position 28, then change direction to travel further down the line.

First robot 30 and second robot 32 are vertically staggered as before, with second robot pedestal 56 being significantly taller. A differed type of product conveyor is used. The product conveyor 12 shown in FIG. 8 approaches the build position from a perpendicular direction. Rather than feeding the products through one pick position to reach the next, it simply feeds the two pick positions simultaneously. Short inclined sections are used in order to place second pick position 24 at a higher elevation than first pick position 22. This elevation offset places each respective pick position closer to its respective robot.

Of course, a single pick position can be used for both robots. Such a pick position can be placed at an intermediate elevation. However, line speed is generally enhanced by providing a dedicated pick position for each robot. It also generally allows the use of a robot with a smaller range of motion.

FIG. 8 shows only one example of many of the line configurations which can be conceived. Line layouts are often dictated by the available floor space and the placement of other components in the overall assembly process. The reader will understand that the novel features of the present invention could be incorporated into literally hundreds of different assembly lines having different appearances.

Although the preceding descriptions contain significant detail they should not be viewed as limiting the invention but rather as providing examples of the preferred embodiments of the invention. As one example, many types of robots can be substituted for the conventional "arm" units shown in the illustrations. Gantry-type robots can function just as well using the vertically-staggered approach. Accordingly, the scope of the invention should be determined by the following claims, rather than the examples given.

Having described our invention, we claim:

1. An assembly line for stacking products on pallets to a specified total height, comprising:
   a. a pallet conveyor having a conveyor path direction, including
      i. a first build position,
      ii. a second build position downstream of the first build position in the conveyor path direction;
   b. a pallet supply adjacent the conveyor, including an elevator for sequentially placing a plurality of pallets onto said pallet conveyor;
   c. a product supply device supplying a plurality of products to be stacked on said pallets, wherein the product supply is offset in a horizontal direction from the pallet conveyor, wherein said product supply further comprises:
      i. a first product conveyor supplying said products to a first pick position located proximate said first robot;
      ii. a second product conveyor supplying said products to a second pick position located proximate said second robot, and
      wherein said first pick position is at a low elevation and said second pick position is at a high elevation;
   d. a first robot, located proximate said first build position and positioned on a first base at a low elevation so that the range of motion of said first robot encompasses said product supply and said first build position up to an elevation greater than one half of said specified total height of said pallets, said first robot configured to pick up a first product selected from said plurality of products from said product supply, transport said first product from said product supply to said first build position, and deposit said first product on one of said pallets; and
   e. a second robot, located proximate said second build and positioned on a second base which elevates the second robot higher than first base elevates the first robot, wherein the second base is at a high elevation, so that said range of motion of said second robot encompasses said product supply and said second build position up to an elevation greater than said specified total height of said pallets, said second robot configured to pick up a second product selected from said plurality of products from said product supply, transport said second product from said product supply to said second build position, and deposit said second product on one of said pallets.

2. An assembly line as recited in claim 1, wherein:
   a. said first robot is located atop the first base which comprises a first robot pedestal;
   b. said second robot is located atop the second base which comprises a second robot pedestal;
   c. said product conveyor passes beneath said second robot and through said second robot pedestal; and
   d. said product conveyor passes beneath said first robot and through said first robot pedestal.

3. An assembly line for slacking products on pallets to a specified total height, comprising:
   a. a pallet conveyor having a conveyor path direction, including
      i. a first build position,
      ii. a second build position downstream of the first build, position in the conveyor path direction,
      iii. a third build position downstream of the first build position in the conveyor path direction;
   b. a pallet supply device adjacent the pallet conveyor and placing a plurality of pallets onto said pallet conveyor;
   c. product supply capable of supplying a plurality of products to be stacked on said pallets, wherein the product supply is offset in a horizontal direction from the pallet conveyor and said product supply comprises a product conveyor including:
      i. a first pick position located proximate said first robot;
      ii. a second pick position located proximate said second robot;
      iii. a third pick position located proximate said third robot
   d. a first robot, located proximate said first build position, wherein said first robot is on a first base at a low elevation so that the range of motion of said first robot encompasses said product supply and said first build position up to an elevation greater than one third of said specified total height of said pallets, aid first robot configured to pick up a first product selected from said plurality of products from said product supply, transport said first product from said product supply to said first build position, and deposit said first product on one of said pallets;

e. a third robot, located proximate said third build position, wherein said third robot is on a third base at a high elevation, so that said range of motion of said third robot encompasses said product supply and said third build position up to an elevation greater than said specified total height of said pallets, said third robot configured to pick up a third product selected from said plurality of products from said product supply, transport said third product from said product supply to said third build position, and deposit said third product on one of said pallets;

f. a second robot, located proximate said second build position, wherein said second robot is on a second base at an elevation between said elevation of said first base and said elevation of said third base, so that said, range of motion of said second robot encompasses said product supply and said second build position at an elevation less than one third of said specified total height of said pallets and greater than two thirds of said specified total height of said pallets, said second robot configured to pick up a second product selected from said plurality of products from said product supply, transport said second product from said product supply to said second build position, and deposit said second product on one of said pallets, and wherein:

said first robot is located atop the first base which comprises a first robot pedestal;
said second robot is located atop the second base which comprises a second robot pedestal;
said third robot is located atop the third base which comprises a third robot pedestal;
said product conveyor passes beneath said third robot and through said third robot pedestal;
said product conveyor passes beneath said second robot and through said second robot pedestal; and
said product conveyor passes beneath said first robot and through said first robot pedestal.

4. An assembly line as recited in claim 3, wherein:
a. said product conveyor feeds said products first to said third pick position and then to said second pick position; and
b. said third pick position includes a through-feed gate which controls the flow of said products to said second pick position.

5. A method of stacking products on pallets to a specified total height, comprising:
a. providing an assembly line, including
  i. a pallet conveyor, including
    1. a first build position
    2. a second build position downstream of the first build position in a pallet conveying direction of the conveyor,
  ii. pallet supply, capable of placing a plurality of pallets onto said pallet conveyor,
  iii. product supply capable of supplying a plurality of products to be stacked on said pallets, wherein the product supply is offset in a horizontal direction from the pallet conveyor and said product supply comprises a product conveyor including:
    1. a first pick position located proximate said first robot; and
    2. a second pick position located proximate said second robot;
  iv. a first pick-and-place robot, located proximate said first build position and on a first base at a low elevation so that the range of motion of said first robot encompasses said product supply and said first build position up to an elevation greater than one half of said specified total height of said pallets,
  v. a second pick-and-place robot, located proximate said second build position and on a second base at a high elevation, so that said range of motion of said second robot encompasses said product supply and said second build position up to an elevation greater than said specified total height of said pallets;
b. actuating said pallet supply to place a first pallet on said pallet conveyor;
c. actuating said pallet conveyor in order to move said first pallet to said first build position;
d. actuating said first robot to pick up, transport, and stack said products on said first pallet up to approximately one half of said specified total height; e. actuating said pallet supply to place a second pallet on said pallet conveyor;
e. actuating said pallet conveyor to move said first pallet to said second build position and said second, pallet to said first build position;
f. actuating said second robot to stack said products on said first pallet up to said specified total height;
g. at approximately the same time, actuating said first robot to stack, said products on said second pallet up to approximately one half of said specified total height, and wherein:
said first robot is located atop the first base which comprises a first robot pedestal;
said second robot is located atop the second base which comprises a second robot pedestal;
said product conveyor passes beneath said second robot and through said second robot pedestal; and
said product conveyor passes beneath said first robot and through said first robot pedestal.

6. A method as recited in claim 5, wherein:
a. said product conveyor feeds said products first to said second pick position and then to said first pick position; and
b. said second pick position includes a through-feed gate which controls the flow of said products to said first pick position.

7. A method as recited in claim 5, wherein:
a. said product conveyor feeds said products first to said first pick position and then to said second pick position; and
b. said first pick position includes a through-feed gate which controls the flow of said products to said second pick position.

* * * * *